(12) United States Patent
Wang et al.

(10) Patent No.: US 9,743,454 B2
(45) Date of Patent: Aug. 22, 2017

(54) METHOD AND APPARATUS FOR MANAGING FAILED CONNECTION REQUESTS FOR DEVICES IN AN INACTIVE MODE

(71) Applicant: AT&T Intellectual Property I, LP, Atlanta, GA (US)

(72) Inventors: Jianrong Wang, Issaquah, WA (US); Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 234 days.

(21) Appl. No.: 14/590,062

(22) Filed: Jan. 6, 2015

(65) Prior Publication Data

US 2016/0198514 A1 Jul. 7, 2016

(51) Int. Cl.
*H04W 76/02* (2009.01)
*H04W 52/02* (2009.01)
*H04W 76/04* (2009.01)

(52) U.S. Cl.
CPC ..... *H04W 76/027* (2013.01); *H04W 52/0209* (2013.01); *H04W 52/0238* (2013.01); *H04W 76/048* (2013.01); *Y02B 60/50* (2013.01)

(58) Field of Classification Search
None
See application file for complete search history.

(56) References Cited

U.S. PATENT DOCUMENTS

| 6,058,289 | A | 5/2000 | Gardner |
| 7,577,449 | B2 | 8/2009 | Simpson et al. |
| 8,351,922 | B2 | 1/2013 | Wang et al. |
| 8,891,492 | B1 | 11/2014 | Kopikare |
| 2010/0261490 | A1* | 10/2010 | Berry ............... H04W 4/12 455/466 |
| 2011/0183726 | A1* | 7/2011 | Deng ............... H04W 52/0241 455/574 |
| 2012/0044822 | A1* | 2/2012 | Kim ............... H04W 24/10 370/252 |
| 2013/0229964 | A1 | 9/2013 | Chakravarthy et al. |
| 2013/0308514 | A1 | 11/2013 | Yokoyama |

(Continued)

OTHER PUBLICATIONS

Agoulmine, et al., "Mobility Management in 4G Wireless Heterogeneous Networks", Universite D'Evry Val-D'Essonne, 2008, 182 pages.

(Continued)

*Primary Examiner* — Kodzovi Acolatse
(74) *Attorney, Agent, or Firm* — Guntin & Gust, PLC; Joseph Hrutka (57) ABSTRACT

Aspects of the subject disclosure may include, for example, a network device that receives a failure message from a mobility management entity where the failure message indicates that a first connection request from an application server to an end user device failed based on the end user device being in an inactive mode, where the network device provides to the application server a target time for transmitting a second connection request to the end user device, and where the providing of the target time to the application server causes the application server to cease transmitting connection requests to the end user device until the target time. Other embodiments are disclosed.

20 Claims, 5 Drawing Sheets

(56) References Cited

U.S. PATENT DOCUMENTS

2014/0064168 A1* 3/2014 Horiguchi ......... H04W 52/0229
                                                    370/311
2014/0092799 A1   4/2014 Jain et al.
2014/0273842 A1   9/2014 Takayanagi
2014/0378114 A1* 12/2014 Lim ..................... H04W 8/08
                                                    455/418
2016/0219511 A1*  7/2016 Yang ................. H04W 52/0216

OTHER PUBLICATIONS

Liou, Ren-Haung et al., "An investigation on LTE mobility management", Mobile Computing, IEEE Transactions on 12.1, 2013, 166-176.

* cited by examiner

METHOD AND APPARATUS FOR MANAGING FAILED CONNECTION REQUESTS FOR DEVICES IN AN INACTIVE MODE

FIELD OF THE DISCLOSURE

The subject disclosure relates to a method and apparatus for managing failed connection requests for devices in an inactive mode.

BACKGROUND

It is often desirable to reduce power consumption and extend battery life in communication devices. One method of doing so is through use of inactive modes, such as sleep or power saving modes, where a device will enter the mode based on a triggering event, such as inactivity of the device that satisfies an inactivity threshold. However, while the device is in an inactive mode, it may not be able to respond to connection requests from other devices. Failed connection requests increase network traffic and can decrease the efficiency of communications over the network.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for managing communications, including connection requests, for devices having an inactive mode such as a power savings mode. One or more of the embodiments can reduce the number of failed connection requests directed to devices in an inactive mode. Other embodiments are described in the subject disclosure.

One or more aspects of the subject disclosure includes providing a network device, such as an Application Communication Assistant Function (ACAF), in a communications network. The ACAF can interface with one or more other functional nodes of the network such as nodes in the Evolved Packet Core (EPC), including one or more of the Mobility Management Entity (MME), Home Subscriber Server (HSS), Serving Gateway (SGW), the Packet Data node Gateway (PGW), and/or the Policy Charging Rules Function (PCRF) to more efficiently assist communications between an end user device (UE) and external applications, such as being executed by an application server of the network. The ACAF can be a stand-alone device in the network, such as located at an edge of the EPC, or can be co-located with other functions, such as co-located with the MME.

In one embodiment, when the UE is in an inactive mode, such as a power savings or sleep mode, only the MME and the UE may know the active time of the UE until the UE wakes up to answer any network paging. When a connection request for the UE is received, the UE may not answer the network paging since the UE is in the power savings mode, and the request may fail. In one embodiment, the MME can notify the ACAF with information for the failed connection request such as UE identification information (e.g., IP address and/or MSISDN), an active time period for the UE, and/or information about the requesting application server (e.g., IP address).

Based upon the particular network configuration and data flow being implemented in the EPC, the ACAF can interface with other network functions and devices to get a UE profile, network policies pertaining to the UE, and/or network status information (e.g., network load situation, resource availability, predicted network traffic, scheduled network maintenance, and so forth). The ACAF can communicate with the application server that originated the failed connection request to the UE. For instance, the ACAF can send an out-of-band status update using an interface, such as via an Rx, IP or web interface that the application server utilizes. The communication from the ACAF to the application server can include various information associated with the UE to facilitate the application server obtaining a successful connection request with the UE. The information can include the UE status and/or a schedule or window in which the UE will be waking up from the power savings mode. In one embodiment, the ACAF can also indicate to the application server a preferred or target time for the application server to request IP connections, such as according to various factors including network load, connection request priorities, user preferences, and so forth.

In one embodiment, the ACAF can also record or otherwise store connection request information associated with the UE and the application server, and can register with the HSS for the data connection request to the UE. In this example, when the UE wakes up, attaches to the network or performs some other action that enables network detection of activity of the UE, the HSS can notify the ACAF according to the registration by the ACAF. In response to the notice from the HSS, the ACAF can then provide notification to the application server of the UE wake up status so that the application server can resend the connection request to the UE.

In another embodiment, the ACAF can also send a message to the UE to notify the UE about the connection request from the application server. This notification to the UE can be done in conjunction with notifying the application server that the UE is no longer in power savings mode or can be done in place of notifying the application server.

In one or more embodiments, the ACAF can connect to network Operations, Administrations and Maintenance (OAM) nodes to obtain data for prioritizing connection requests and/or for determining more efficient time periods for transmitting requests, including network traffic status and/or network management/traffic routing requirements. In one or more embodiments, the ACAF can evaluate the nature of the application seeking the connection request in order to interpret application IP connection request priorities.

In one or more embodiments, the ACAF can analyze the UE communication and mobility profiles, either by managing these profiles itself, or by interworking with the HSS. In one or more embodiments, the ACAF can manage IP packet delivery scheduling according to request priorities, UE communication and mobility profiles, and network conditions. In one or more embodiments, when interworking with the network API GW, the ACAF can provide an interface to allow applications to query information about device status, network traffic status, and/or delivery scheduling.

In one or more embodiments, the ACAF can manage UE connection requests which cannot be delivered during a first request, such as where the UE is in a power savings mode or other type of sleep mode. The ACAF can communicate to application servers on behalf of the network for desired delivery behaviors, and/or can provide a mechanism to link the application delivery with network management and traffic improvements or optimizations.

One embodiment of the subject disclosure is a method that includes receiving, by a network device including a processor, a failure message from a mobility management entity. The failure message indicates that a first connection request from an application server to an end user device failed based on the end user device being in an inactive mode. The failure message includes first identification information for the end user device, second identification information for the application server, and timing information associated with an active time period for the end user device when the end user device will not be in the inactive mode. The method includes providing, by the network device to the application server, a target time for transmitting a second connection request to the end user device. The target time is within the active time period. The providing of the target time to the application server causes the application server to cease re-transmitting connection requests to the end user device until the target time.

One embodiment of the subject disclosure includes a device having a processor, and a memory that stores executable instructions that, when executed by the processor, facilitate performance of operations, including receiving a failure message from a mobility management entity. The failure message indicates that a first connection request from an application server to an end user device has failed based on the end user device being in an inactive mode. The failure message includes connection request information comprising first identification information for the end user device and second identification information for the application server. The processor, responsive to the failure message, can register with a home subscriber server based on the connection request information. The processor, responsive to a determination of activity of the end user device, can receive an activity status message from the home subscriber server. The processor, responsive to the activity status message, can provide a status update to the application server that causes the application server to send a second connection request to the end user device.

One embodiment of the subject disclosure includes a machine-readable storage medium, comprising executable instructions that, when executed by a processor of an application server, facilitate performance of operations, including transmitting a first connection request to an end user device, where the first connection request results in a failure based on the end user device being in an inactive mode. The failure of the first connection request causes a network device to receive a failure message from a mobility management entity. The failure message indicates the failure and includes first identification information for the end user device and second identification information for the application server. The processor can receive, from the network device, a target time for transmitting a second connection request to the end user device. The processor, responsive to the receiving of the target time, can cease transmitting connection requests from the application server to the end user device until the target time. The processor can transmit a second connection request to the end user device according to the target time.

Figure 1:
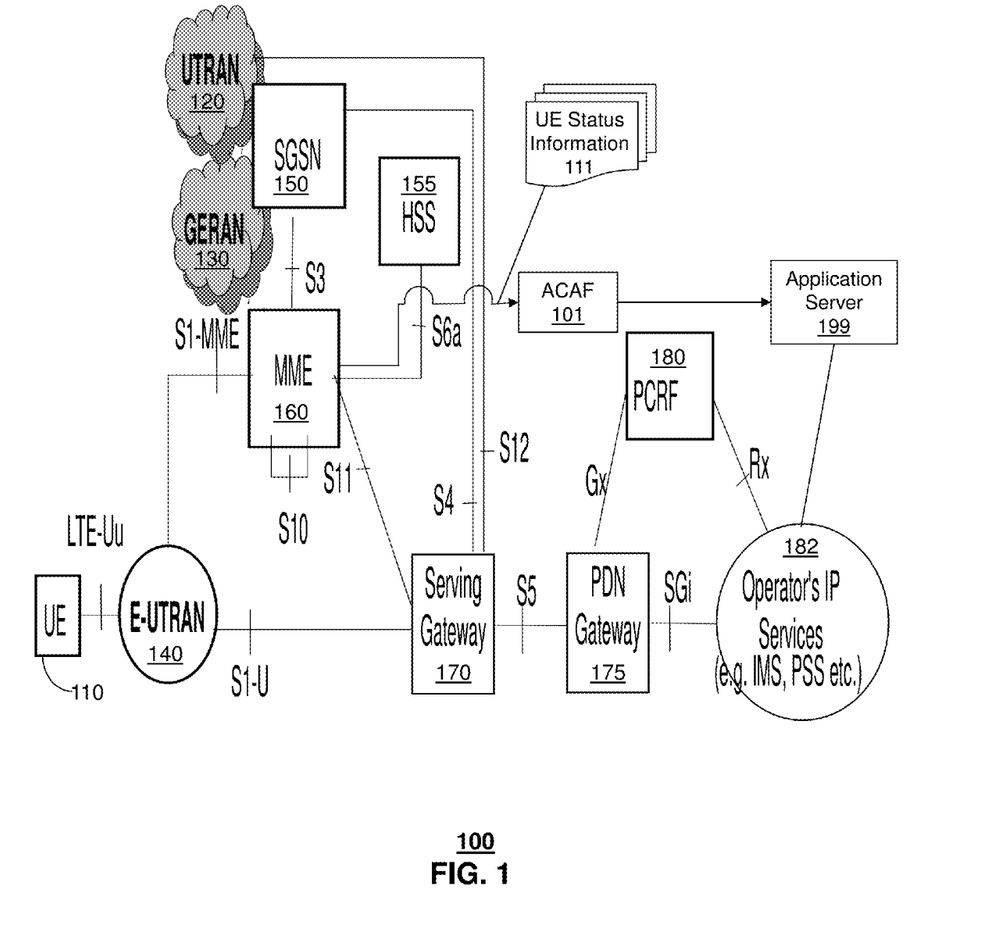
FIG. 1 depicts an illustrative embodiment of a communication system that provides communication services and manages failed connection requests for devices in inactive modes.

FIG. 1 depicts an illustrative embodiment of a system that can manage failed connection requests between applications servers and UE's. The management can include reducing the number of subsequent failed connection requests between an application server and a UE by monitoring the UE status, including active time periods in which the UE is not or will not be in an inactive mode (e.g., a power savings mode). In one embodiment, the application server can be notified that its connection request failed because the UE was in an inactive mode. In another embodiment, the application server can be provided with timing information, such as a target time to send a subsequent connection request to the UE. The target time can be determined based on various factors, including the active time period for the UE, network loads, network resource capabilities, prioritization of connection requests, and so forth. In one embodiment, the application server can refrain from sending any connection requests to the UE prior to the target time.

In another embodiment, HSS registration can be utilized so that activity of the UE, such as a network attachment, can be monitored so that the application server can be made aware of when the UE is no longer in an inactive mode. In one embodiment, the HSS registration can also be utilized to inform the UE of any failed connection requests from the application server(s).

In FIG. 1, a communication system 100 is illustrated that can provide communication services, including voice, video and/or data services to communication devices, such as UE 110. System 100 can enable communication services over a number of different network elements, such as between UE 110 and another communication device (e.g., a second UE) not shown. UE 110 can be a number of different types of devices that are capable of voice, video and/or data communications, including a mobile device (e.g., a smartphone), a personal computer, a set top box, a multi-mode communication device, a vehicle communication system, and so forth.

System 100 can include one or more of a Universal Terrestrial Radio Access Network (UTRAN) 120, a Global System for Mobile communications (GSM) Enhanced Data rates for GSM Evolution (EDGE) Radio Access Network 130 (herein referred to as GERAN 130), and an E-UTRAN 140. The system 100 can further include one or more of a Serving General Packet Radio Service Support Node (SGSN) 150, and an MME 160. Other components not shown can also be utilized for providing communication services to the UE 110, such as a Mobile Switching Center (MSC) which can facilitate routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, system 100 can provide for circuit switched fallback for packet switching so as to enable the provisioning of voice and other circuit switched-domain services (e.g., circuit switched UDI video/LCS/USSD) by reuse of circuit switched infrastructure, such as when the UE 110 is served by E-UTRAN 140. In one or more embodiments, a circuit-switched fallback enabled terminal (e.g., UE 110) connected to E-UTRAN 140 may use GERAN 130 or UTRAN 120 to connect to the circuit switched-domain. In one or more embodiments, the circuit switched fallback and Internet Protocol Multimedia Subsystem (IMS)-based services of system 100 can co-exist in a single service operator's network 182 or can be managed by different service providers.

In one or more embodiments, UTRAN 120 can include node B's and radio network controllers which enable carrying many traffic types including real-time circuit-switched to IP-based packet switched traffic. The UTRAN 120 can also enable connectivity between the UE 110 and the core network. The UTRAN 120 can utilize a number of interfaces including Iu, Uu, Iub and/or Iur. In one or more embodiments, GERAN 130 can facilitate communications between base stations (e.g., Ater and Abis interfaces) and base station controllers (e.g., A interfaces).

In one or more embodiments, E-UTRAN 140 can be the air interface for the LTE upgrade path for mobile networks according to the 3GPP specification. E-UTRAN 140 can include enodeBs on the network that are connected to each other such as via an X2 interface, which are connectable to the packet switch core network via an S1 interface. For example, E-UTRAN 140 can use various communication techniques including orthogonal frequency-division multiplexing (OFDM), multiple-input multiple-output (MIMO) antenna technology depending on the capabilities of the terminal, and beamforming for downlink to support more users, higher data rates and lower processing power required on each handset.

In one or more embodiments, the SGSN 150 can assume responsibility for delivery of data packets from and to mobile stations within the SGSN's geographical service or coverage area. The SGSN 150 can perform functions including packet routing and transfer, mobility management (e.g., attach/detach and location management), logical link management, and/or authentication and charging functions. In one or more embodiments, a location register of the SGSN 150 can store location information (e.g., current cell) and user profiles (e.g., addresses used in the packet data network) of users registered with the SGSN. In one or more embodiments, the SGSN 150 can de-tunnel GTP packets from a GGSN (downlink), tunnel IP packets toward the GGSN (uplink), carry out mobility management as a standby mode mobile device moves between routing areas, and process or facilitate billing of user data. In other embodiments, the SGSN 150 can perform functions associated with Enhanced Data Rates for GSM Evolution (EDGE). For instance, the SGSN 150 can connect via frame relay or IP to the packet control unit using the Gb protocol stack, accept uplink data to form IP packets, encrypt down-link data, decrypt up-link data, and carry out mobility management to the level of a cell for connected mode mobiles. In one or more embodiments, the SGSN 150 can tunnel/de-tunnel downlink/uplink packets toward the RNC and carry out mobility management to the level of an RNC for connected mode mobiles.

In one or more embodiments, a Home Subscriber Server (HSS) 155 can be provided which is a central database that contains user-related and subscription-related information. The functions of the HSS 155 can include mobility management, call and session establishment support, user authentication and access authorization. In one embodiment, the HSS 155 can manage subscription-related information in real time, for multi-access and multi-domain offerings in an all-IP environment. The HSS 155 can be based on Home Location Register (HLR) and Authentication Center (AuC).

In one or more embodiments, MME 160 can perform the function of a control-node, such as for an LTE access network. For example, the MME 160 can perform functions such as idle mode UE tracking and paging procedures including retransmissions. The MME 160 can handle, participate in or otherwise facilitate the bearer activation/deactivation process. The MME 160 can also choose a serving gateway (e.g., SGW 170) for the UE 110 such as at the initial attach and at time of intra-LTE handover involving node (e.g., core network) relocation. The MME 160 can perform user authentication, such as via interaction with the HSS 155. Non Access Stratum signaling can terminate at the MME 160. In one or more embodiments, identities (e.g., temporary) can be processed, such as generated and/or allocated, by the MME 160 for UE's. The MME 160 can process (e.g., verifying authorization) camping by a UE on a service providers PLMN and can enforce UE roaming restrictions.

In one or more embodiments, the MME 160 can provide control plane function for mobility between LTE and 2G/3G access networks via an S3 interface terminating at the MME from the SGSN as shown in FIG. 1. The MME 160 can terminate an S6a interface towards the HSS 155 for roaming UEs as also shown in FIG. 1. In one embodiment, the MME 160 can be a termination point in a network for ciphering/integrity protection for NAS signaling and can handle security key management. Lawful interception of signaling can also be supported by or otherwise facilitated by the MME 160.

In one or more embodiments, the SGW 170 can route and forward user data packets, while also acting as the mobility anchor for the user plane during inter-eNodeB handovers and as the anchor for mobility between LTE and other 3GPP technologies (e.g., terminating S4 interface and relaying the traffic between 2G/3G systems and PGW). For idle state UEs, the SGW 170 can terminate the downlink data path and can trigger paging when downlink data arrives for the UE. The SGW 170 can manage and can store UE contexts, e.g. parameters of the IP bearer service, network internal routing information.

In one or more embodiments, the PGW 175 can provide connectivity from the UE 110 to external packet data networks by being the point of exit and entry of traffic for the UE. A UE 110 can have simultaneous connectivity with more than one PGW 175 for accessing multiple PDNs. The PGW 175 can perform policy enforcement, packet filtering for each user, charging support, lawful interception and/or packet screening. The PGW 175 can also act as the anchor for mobility between 3GPP and non-3GPP technologies such as WiMAX and 3GPP2 (CDMA 1× and EvDO).

In one or more embodiments, a PCRF 180 can be provided. For example, the PCRF 180 can be a software node designated in real-time to determine policy rules. As a policy tool, the PCRF 180 can operate at the network core and can access subscriber databases and other specialized functions, such as a charging system, in a centralized manner. The PCRF 180 can aggregate information to and from the network, operational support systems, and other sources (such as portals) in real time, supporting the creation of rules and then automatically making policy decisions for each subscriber active on the network. The PCRF 180 can provide a network agnostic solution (e.g., wire line and/or wireless) and can be integrated with different platforms like billing, rating, charging, and subscriber database or can also be deployed as a standalone entity. The functions performed by the PCRF 180 can be any variety of functions, such as computer implemented steps in a process or algorithm associated with operation of a mobile communications network. As an example, the PCRF 180 can aggregate information in a hosting network and can make policy decisions for each subscriber active in the network automatically. Operational support systems (OSS) can support the creation of rules which can assist in policy making. The PCRF 180 can operate according to a received session and media related information through an application function. Subscriber information databases and other specialized functions can be made accessible to the PCRF 180.

In one embodiment, system 100 can include a network device such as an ACAF 101 that is in communication with the MME 160 to detect or otherwise determine when a connection request, such as from an application server 199, to the UE 110 has failed due to the UE being in an inactive mode. The particular type of inactive mode can vary and can include a power savings mode, a sleep mode, a DRX mode where an UE is in discontinuous reception and transmission, or a mode in which the UE is unable to respond to network paging associated with a connection request.

In one embodiment, the ACAF 101 can receive a failure message 111 from the MME 160 in response to a failed connection request from the application server 199 to the UE 110. The failure message 111 can indicate that the failure was due to the UE 110 being in an inactive mode. In one embodiment, the failure message 111 can include first identification information for the UE 110 and second identification information for the application server 199. The identification information can be various types including IP addresses, Mobile Subscriber ISDN number (MSISDN), and so forth. In another embodiment, the failure message can include timing information associated with an active time period for the UE 110 when the UE will not be in the inactive mode.

The ACAF 101 can facilitate the connection requests directed to UEs in inactive modes and can reduce the number of failed subsequent connection requests to the same UEs. In one embodiment in response to receiving the failure message 111, the ACAF 101 can provide a target time to the application server 199 for transmitting a subsequent connection request to the UE 110. The target time can be within an active time period for the UE 110 that is designated in the failure message 111 or determined by the ACAF 101 by other techniques such as contacting other network elements that are aware of the inactivity time periods for a particular UE. In this example, the providing of the target time by the ACAF 101 to the application server 199 causes the application server to cease re-transmitting connection requests to the UE 110 until the target time.

In one embodiment, the target time for the subsequent connection request can be determined by the ACAF 101 according to network status data corresponding to the active time period. For example, the network status data can include predicted network traffic corresponding to the active time period, where the predicted network traffic is determined according to historical network traffic and/or scheduled network maintenance. In another example, the network status data can include predicted resource availability corresponding to the active time period, where the predicted resource availability is determined according to historical resource availability and/or scheduled network maintenance.

In another embodiment, the ACAF 101 can determine the target time for the subsequent connection request according to prioritization of the connection request. For example, the ACAF 101 can prioritize the first connection request among a group of connection requests to generate a priority for the first connection request. The prioritization can be based on a number of factors such as a type of application requesting the connection, user preferences, and so forth.

In one embodiment in response to receiving the failure message 111, the ACAF 101 can register with the HSS 155 such as based on connection request information included in the failure message such as identification information for the UE 110 and identification information for the application server 199. Responsive to a detection or a determination of activity of the end user device (e.g., detected by a network element in the EPC that informs the HSS), the ACAF 101 can receive an activity status message from the HSS 155. The activity status message can inform the ACAF 101 of the activity of the UE 110, such as the UE no longer being in a power savings mode or the UE attempting or achieving a network attachment, and so forth.

In one embodiment in response to the activity status message from the HSS 155, the ACAF 101 can provide a status update to the application server 199 that causes the application server to send the second connection request to the UE 110. For example, the activity status message can inform the application server that UE is no longer in the power savings mode. In another example, the activity status message can include a target time for the application server 199 to transmit the second connection request. For instance, the target time can be determined (e.g., by the ACAF 101 or by another device) according to network status data including predicted network traffic determined according to historical network traffic and/or scheduled network maintenance. In another example, the network status data can include predicted resource availability determined according to historical resource availability and/or scheduled network maintenance. In another embodiment, the target time for the second connection request can be determined (e.g., by the ACAF 101 or by another device) according to prioritization of the first connection request among a group of connection requests such as based on one or more of a type of application requesting the connection, user preferences, and so forth.

In another embodiment in response to the activity status message from the HSS 155, the ACAF 101 can provide a failed connection report or message to the UE 110 that indicates that the first connection request from the application server 199 to the UE 110 failed based on the UE being in the inactive mode. The failed connection report or message can include various information, such as identification information for the application server 199, identification of the application associated with the failed connection request, and so forth. In one embodiment, the providing of the status update by the ACAF 101 to the application server 199 (which triggers the second connection request) can be responsive to the providing of the failed connection report or message to the UE 110 and/or can be subject to authorization by the UE.

In one or more embodiments, according to the particular network configuration, the ACAF 101 can interface with various other network devices and/or functions to obtain information to facilitate management of failed connection requests to UEs that are in an inactive mode. For example, the ACAF 101 can obtain UE profiles, network policies, and/or network load situations from various devices including the PCRF 180 and/or OAM node(s). In one embodiment, the ACAF 101 can provide the target time and/or the status update to the application server 199 utilizing an out-of-band interface.

Figure 2:
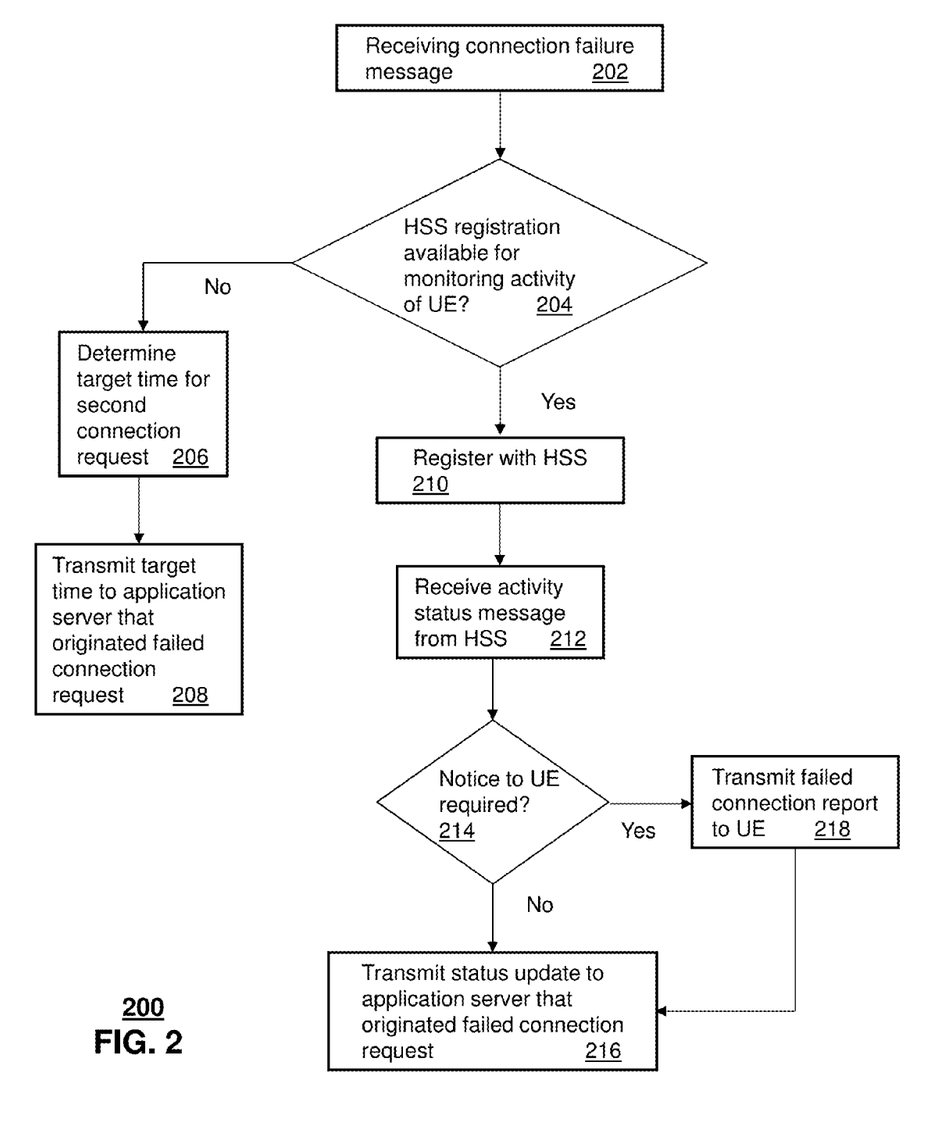
FIG. 2 depicts an illustrative embodiment of a method used in portions of the system described in FIG. 1.

FIG. 2 depicts an illustrative embodiment of a method 200 used by system 100 for managing failed connection requests. At 202, a network device (e.g., the ACAF 101) can receive a failure message from another network device (e.g., the MME 160) which indicates that a connection request from the application server 199 to the UE 110 has failed due to the UE being in an inactive mode. The failure message 111 can include various information such as an IP address and/or MSDSDN for the UE 110, an IP address for the application server 199, and/or timing information associated with an active time period for the UE when the UE will no longer be in the inactive mode.

At 204, the ACAF 101 can determine whether an HSS activity monitoring registration procedure is available or is desired (e.g., according to network policy, subscription agreement and/or user preference). If the HSS 155 does not provide for the registration procedure or use of the registration procedure is not desired, then at 206 the ACAF 101 can determine or otherwise obtain a target time for the application server 199 to transmit a second connection request to the UE 110. For instance, the target time can be selected by the ACAF 101 or selected by another device from within an active time period when the UE 110 will no longer be in the inactive mode.

In one embodiment, the active time period for the UE 110 can be designated in the failure message received from the MME 160. Where the target time is selected from within the active time period for the UE 110, various factors can be utilized, such as historical network traffic, scheduled network maintenance, historical resource availability, and/or prioritization of the connection request among a group of connection requests (directed to the UE 110 and/or directed to other UEs).

At 208, the target time can be transmitted by the ACAF 101 to the application server 199. The providing of the target time by the ACAF 101 to the application server 199 can cause the application server to cease transmitting connection requests to the UE 110 until the target time. Once the target time is reached then the application server 199 can transmit the second connection request to the UE 110.

Returning back to 204, if an HSS activity monitoring registration procedure is available and/or desired then at 210 the ACAF 101 can register with the HSS. The registration can be according to various information, such as identification for the UE 110 and for the application server 199 which was included in the failure message received by the ACAF 101 from the MME 160. At 212 in response to a detection of activity of the UE 110 (e.g., a network attachment or the UE leaving the inactivity mode), the ACAF 101 can receive an activity status message from the HSS 155. The activity status message can inform the ACAF 101 of the activity of the UE 110, such as the UE no longer being in a power savings mode or the UE attempting or achieving a network attachment, and so forth.

At 214, a determination can be made by the ACAF 101 as to whether the UE is to be informed of any failed connection requests. If no notice is required then at 216 in response to the activity status message from the HSS 155, the ACAF 101 can provide a status update to the application server 199 that causes the application server to send the second connection request to the UE 110. In one embodiment, the activity status message can also include a target time for the application server 199 to transmit the second connection request. For instance, the target time can be determined (e.g., by the ACAF 101 or by another device) according to historical network traffic, historical resource availability, scheduled network maintenance, and/or prioritization of the first connection request among a group of connection requests.

If at 214 notice is required then at 218 in response to the activity status message from the HSS 155, the ACAF 101 can provide a failed connection report or message to the UE 110 that indicates that the first connection request from the application server 199 to the UE 110 failed based on the UE being in the inactive mode. The failed connection report or message can include various information, such as identification information for the application server 199, identification of the application associated with the failed connection request, and so forth. Method 200 can then proceed to 216 where the status update is provided by the ACAF 101 to the application server 199 to trigger the second connection request.

Figure 3:
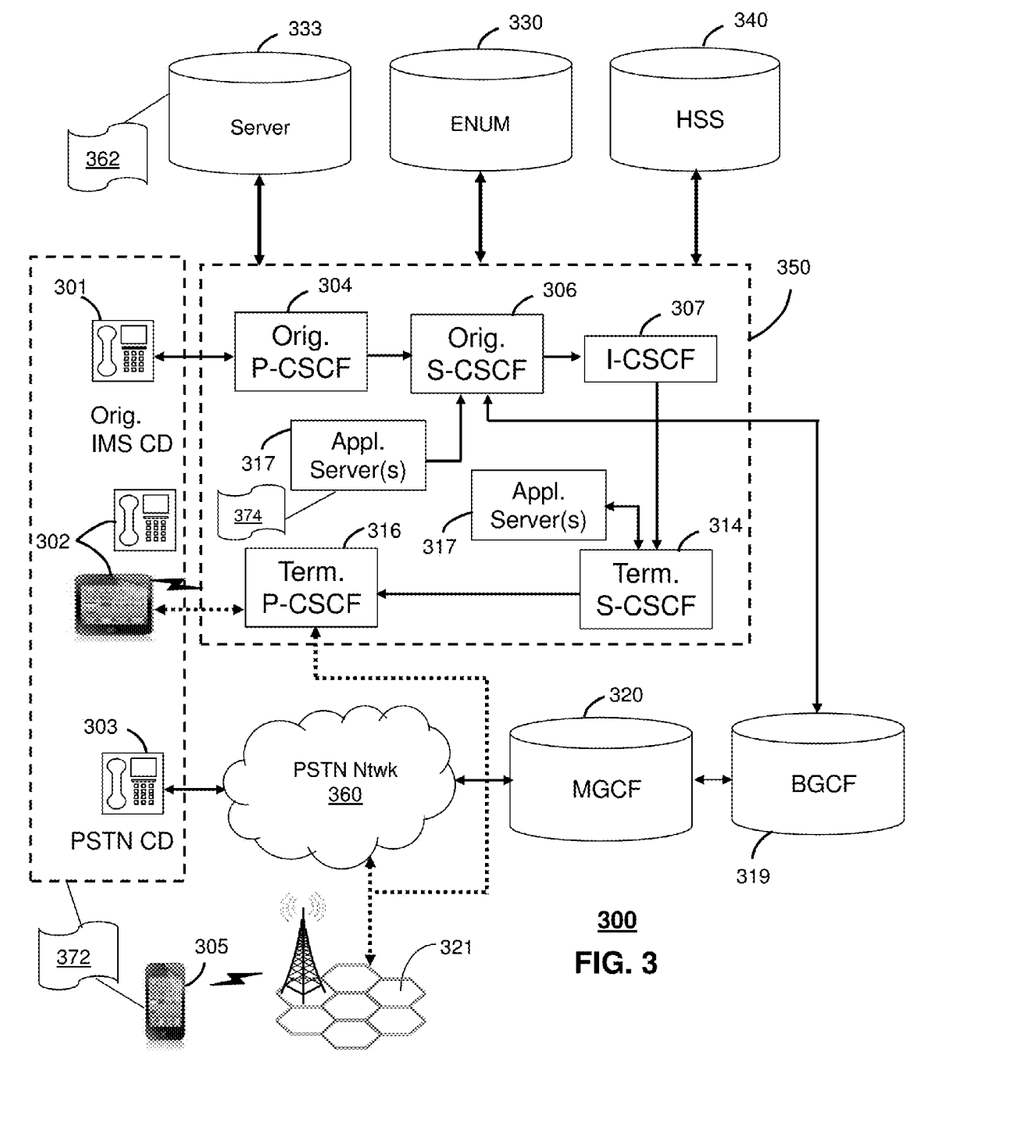
FIG. 3 depicts an illustrative embodiment of a communication system that provides media services including managing failed connection requests.

FIG. 3 depicts an illustrative embodiment of a communication system 300 employing an IP Multimedia Subsystem (IMS) network architecture to facilitate the combined services of circuit-switched and packet-switched systems. Communication system 300 can be overlaid or operably coupled with system 100 of FIG. 1 as another representative embodiment of communication system 300. Communication system 300 enables efficient management of failed connection requests when a UE is in an inactive mode to reduce the number of subsequent failed connection requests while the same UE is still in its inactive mode. An ACAF which can be a separate device or can be integrated with other network elements including the MME can interact with other functional nodes of the network to more efficiently assist communications between the UE and external applications where connection requests are failing due to an inactive mode of the UE. In one or more embodiments, communication system 300 provides for determining a target time (within an active time period of the UE) for a second connection request by an application server, such as based on one or more of network load, resource availability, prioritization of applications requesting the connection, and so forth. In this example, the application server can refrain from transmitting any connection requests to the UE until the target time is reached. In one or more other embodiments, the activity of the UE can be monitored via an HSS registration process so that it can be detected when the UE has left the inactive mode. The monitoring can then be used as a triggering mechanism for the application server to transmit a second connection request to the UE.

Communication system 300 can comprise an HSS 340, a tElephone NUmber Mapping (ENUM) server 330, and other network elements of an IMS network 350. The IMS network 350 can establish communications between IMS-compliant communication devices (CDs) 301, 302, Public Switched Telephone Network (PSTN) CDs 303, 305, and combinations thereof by way of a Media Gateway Control Function (MGCF) 320 coupled to a PSTN network 360. The MGCF 320 need not be used when a communication session involves IMS CD to IMS CD communications. A communication session involving at least one PSTN CD may utilize the MGCF 320.

IMS CDs 301, 302 can register with the IMS network 350 by contacting a Proxy Call Session Control Function (P-CSCF) which communicates with an interrogating CSCF (I-CSCF), which in turn, communicates with a Serving CSCF (S-CSCF) to register the CDs with the HSS 340. To initiate a communication session between CDs, an originating IMS CD 301 can submit a Session Initiation Protocol (SIP INVITE) message to an originating P-CSCF 304 which communicates with a corresponding originating S-CSCF 306. The originating S-CSCF 306 can submit the SIP INVITE message to one or more application servers (ASs) 317 that can provide a variety of services to IMS subscribers.

For example, the application servers 317 can be used to perform originating call feature treatment functions on the calling party number received by the originating S-CSCF 306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 306 can submit queries to the ENUM system 330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE message to the terminating S-CSCF 314. The terminating S-CSCF 314 can then identify a terminating P-CSCF 316 associated with the terminating CD 302. The P-CSCF 316 may then signal the CD 302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 3 may be interchangeable. It is further noted that communication system 300 can be adapted to support video conferencing.

If the terminating communication device is instead a PSTN CD such as CD 303 or CD 305 (in instances where the cellular phone only supports circuit-switched voice communications), the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD over the PSTN network 360 to enable the calling and called parties to engage in voice and/or data communications.

It is further appreciated that the CDs of FIG. 3 can operate as wireline or wireless devices. For example, the CDs of FIG. 3 can be communicatively coupled to a cellular base station 321, a femtocell, a WiFi router, a Digital Enhanced Cordless Telecommunications (DECT) base unit, or another suitable wireless access unit to establish communications with the IMS network 350 of FIG. 3. The cellular access base station 321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 3.

Cellular phones supporting LTE can support packet-switched voice and packet-switched data communications and thus may operate as IMS-compliant mobile devices. In this embodiment, the cellular base station 321 may communicate directly with the IMS network 350 as shown by the arrow connecting the cellular base station 321 and the P-CSCF 316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Server 333 can perform function 362 and thereby provide failed connection management services to the application server(s) 317 and CDs 301, 302, 303 and 305 of FIG. 3 similar to the functions described for ACAF 101 of FIG. 1 in accordance with method 200 of FIG. 2. As an example, function 362 can include receiving a failure message (e.g., from an MME) that indicates that a first connection request from application server 317 to a UE has failed based on the UE being in an inactive mode, where the failure message includes connection request information comprising first identification information for the UE and second identification information for the application server. Function 362 can include, responsive to the failure message, registering with HSS 340 based on the connection request information and, responsive to a determination of activity of the UE, receiving an activity status message from the HSS. Function 362 can include responsive to the activity status message, providing a status update to the application server 317 that causes the application server to send a second connection request to the UE. Function 362 can include providing a second failure message (e.g., a connection failure report) to the UE that indicates that the first connection request from the application server 317 to the end user device failed based on the UE being in the inactive mode.

CDs 301, 302, 303 and 305, which can be adapted with software to perform function 372 to utilize the services of the server 333 similar to the functions described for communication devices 110 of FIG. 1 in accordance with method 200 of FIG. 2. As an example, function 372 can include entering and exiting an inactive mode, such as a power savings mode. Function 372 can also include receiving a second failure message (e.g., a connection failure report) from the server 333 that indicates that the first connection request from the application server 317 to the UE failed based on the UE being in the inactive mode. Function 372 can also include providing permission to the server 333 to notify the application server 317 of the target time for the application server 317 to transmit the second connection request.

Application server(s) 317 can perform function 374, which can be substantially similar to the functions described with respect to application server 199 of FIG. 1. As an example, function 374 can include transmitting a first connection request to a UE, where the first connection request results in a failure based on the UE being in an inactive mode, where the failure of the first connection request causes the server 333 to receive a failure message from a network element (e.g., an MME), and where the failure message indicates the failure and includes first identification information for the UE and second identification information for the application server 317. Function 374 can include receiving, from the server 333, a target time for transmitting a second connection request to the UE, and can include, responsive to the receiving of the target time, ceasing transmitting connection requests to the UE until the target time. The application server 317 can then transmit the second connection request to the UE according to the target time.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 4:
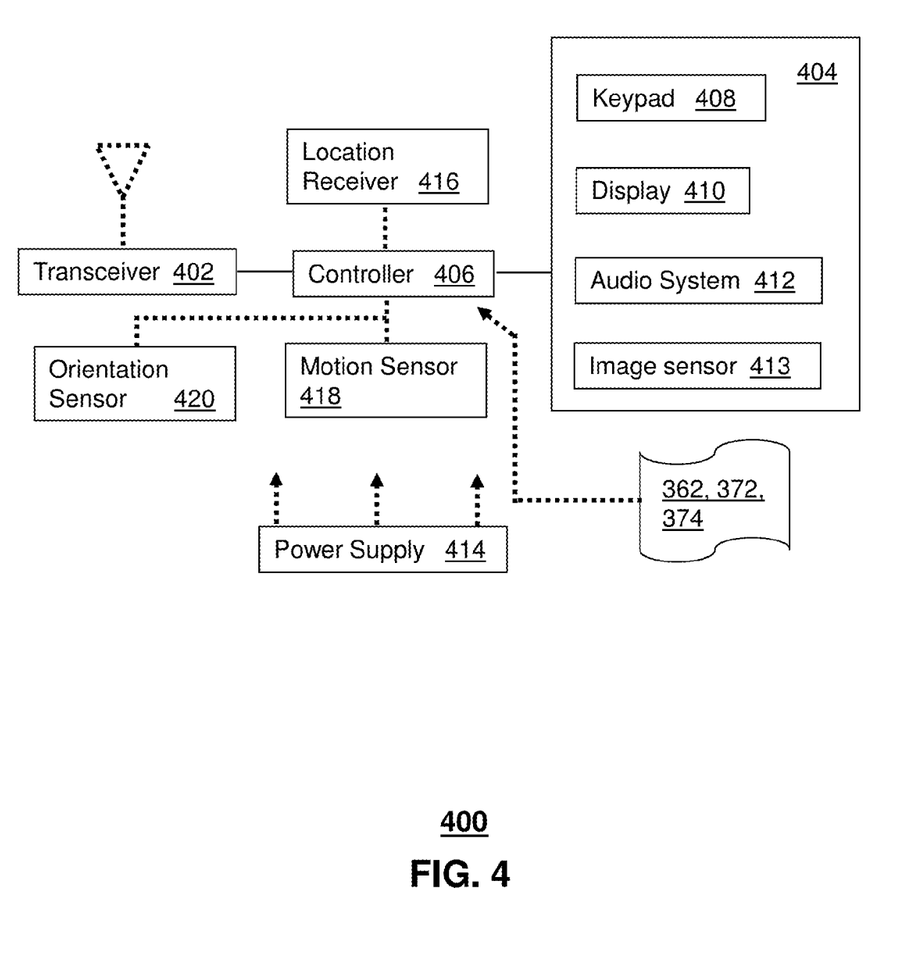
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1 and/or 3 and can be configured to perform portions of method 200 of FIG. 2. As an example, the device 400 can transmit a first connection request to a UE. The first connection request can result in a failure based on the UE being in an inactive mode (e.g. a power savings mode). As a result of the failure of the first connection request, the ACAF 101 or other network device can receive a failure message from an MME where the failure message indicates the failure and includes first identification information for the UE and second identification information for the communication device 400. The communication device 400 can receive, from the ACAF 101, a target time for transmitting a second connection request to the UE. The communication device 400 can cease transmitting connection requests to the UE until the target time and can transmit the second connection request to the UE according to the target time.

Communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth ®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of the ACAF 101, the MME 160, the UE 110, the application server 199, the IMS CDs 301-302 and PSTN CDs 303-305 of FIG. 3, the application server(s) 317, the server 333. It will be appreciated that the communication device 400 can also represent other devices that can operate in systems 100 and 300 of FIGS. 1 and 3 such as a gaming console and a media player, or a field sensor, power/water meter reader, wearable device, a control device in electronic appliances or in automobiles, etc. In addition, the controller 406 can be adapted in various embodiments to perform the functions 362, 372 and 374, respectively.

Upon reviewing the aforementioned embodiments, it would be evident to an artisan with ordinary skill in the art that said embodiments can be modified, reduced, or enhanced without departing from the scope of the claims described below. For example, the failed connection request can be applied to any types of devices including connection requests between non-end user devices. Other factors can be utilized for determining the target time for an application server to send a second connection request, such as user preferences where the UE determines a prioritization of connection requests from different application servers and provides that prioritization to the ACAF 101 which then implements the prioritization scheme. In one or more embodiments, the ACAF 101 can be co-located with other network elements, such as network elements located at the network edge.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
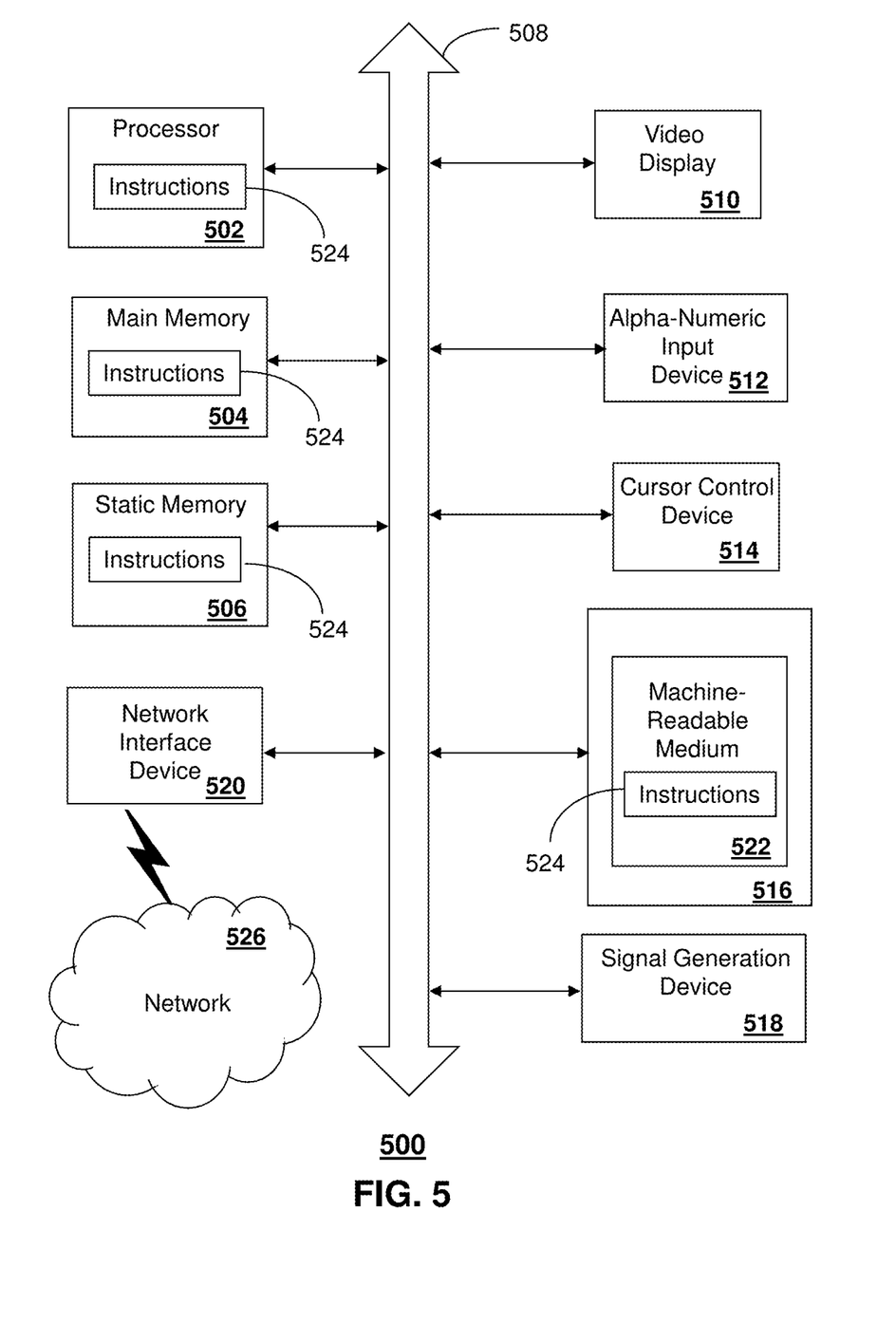
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as the ACAF 101, the server 333 and other devices of FIGS. 1 and 3 to manage failed connection requests resulting from a UE being in an inactive mode. In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, CoAP, MQTT) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a network device including a processor, a notification message from a mobility management entity, wherein the notification message indicates that a first connection request from an application server to an end user device failed based on the end user device being in an inactive mode, wherein the notification message includes first identification information for the end user device, second identification information for the application server, and timing information associated with an active time period for the end user device when the end user device will not be in the inactive mode; and
   providing, by the network device to the application server, a target time for transmitting a subsequent connection request to the end user device, wherein the target time is within the active time period, and wherein the providing of the target time to the application server causes the application server to cease re-transmitting connection requests to the end user device until the target time,
   wherein the first connection request is for communications of the end user device via a serving gateway, wherein the network device, the application server and the serving gateway are remote from each other.

2. The method of claim 1, comprising:
   obtaining, by the network device, network status data corresponding to the active time period; and
   selecting, by the network device, the target time within the active time period according to the network status data.

3. The method of claim 2, comprising:
   prioritizing, by the network device, the first connection request among a group of connection requests to generate a priority for the first connection request,
   wherein the selecting of the target time within the active time period is according to the priority for the first connection request.

4. The method of claim 2, wherein the network status data includes predicted network traffic corresponding to the active time period, and wherein the predicted network traffic is determined according to historical network traffic, scheduled network maintenance, or a combination thereof.

5. The method of claim 2, wherein the network status data includes predicted resource availability corresponding to the active time period, and wherein the predicted resource availability is determined according to historical resource availability, scheduled network maintenance, or a combination thereof.

6. The method of claim 1, wherein the first identification information for the end user device includes a first IP address, and wherein the second identification information for the application server includes a second IP address.

7. The method of claim 1, comprising:
   identifying, by the network device, an application associated with the first connection request;
   prioritizing, by the network device, the first connection request among a group of connection requests according to the identifying of the application to generate a priority for the first connection request; and
   selecting, by the network device, the target time within the active time period according to the priority for the first connection request.

8. The method of claim 1, wherein the inactive mode comprises a power savings mode or a discontinuous reception and transmission mode.

9. An apparatus, comprising:
   a processor; and
   a memory that stores executable instructions that, when executed by the processor, facilitate performance of operations, comprising:
   receiving a failure message from a mobility management entity, wherein the failure message indicates that a first connection request from a server to a communication device has failed based on the communication device being in an inactive mode, wherein the failure message includes connection request information comprising first identification information for the communication device and second identification information for the server;
   responsive to the failure message, registering with a home subscriber server based on the connection request information;
   responsive to a determination of activity of the communication device, receiving an activity status message from the home subscriber server; and
   responsive to the activity status message, providing a status update to the server that causes the server to send a second connection request to the communication device.

10. The apparatus of claim 9, wherein the operations further comprise providing a second failure message to the communication device that indicates that the first connection request from the server to the communication device failed based on the communication device being in the inactive mode.

11. The apparatus of claim 10, wherein the providing of the status update to the server is responsive to the providing of the second failure message to the communication device.

12. The apparatus of claim 9, wherein the determination of the activity of the communication device comprises detecting a network attachment by the communication device.

13. The apparatus of claim 9, wherein the status update includes a target time for transmitting the second connection request to the communication device.

14. The apparatus of claim 13, wherein the target time is determined according to network status data.

15. The apparatus of claim 13, wherein the target time is determined according to prioritizing the first connection request among a group of connection requests.

16. The apparatus of claim 9, wherein the communication device comprises an end user device, wherein the server comprises an application server, and wherein the second connection request is for communications of the end user device via a serving gateway that is remote from the application server.

17. A non-transitory machine-readable storage medium, comprising executable instructions that, when executed by a processor of an application server, facilitate performance of operations, comprising:
  transmitting a first connection request to an end user device, wherein a result of the first connection request is a failure based on the end user device being in an inactive mode, wherein the failure of the first connection request causes a network device to receive a failure message from a mobility management entity, and wherein the failure message indicates the failure and includes first identification information for the end user device and second identification information for the application server;
  receiving, from the network device, a target time for transmitting a second connection request to the end user device;
  responsive to the receiving of the target time, ceasing transmitting connection requests from the application server to the end user device until the target time; and
  transmitting a second connection request to the end user device according to the target time, wherein the target time is determined according to prioritizing the first connection request among a group of connection requests.

18. The non-transitory machine-readable storage medium of claim 17, wherein the failure message includes timing information associated with an active time period for the end user device when the end user device will not be in the inactive mode, and wherein the target time is within the active time period.

19. The non-transitory machine-readable storage medium of claim 17, wherein the target time is determined according to network status data.

20. The non-transitory machine-readable storage medium of claim 17, wherein the second connection request is for communications of the end user device via a serving gateway that is remote from the application server.

* * * * *